Aug. 9, 1966  F. G. GLASBY ETAL  3,264,956
METHOD OF MAKING SPIRALLY WOUND CONTAINERS
Filed Aug. 20, 1963  5 Sheets-Sheet 1
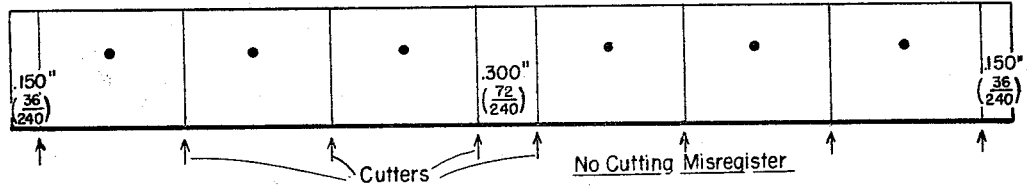
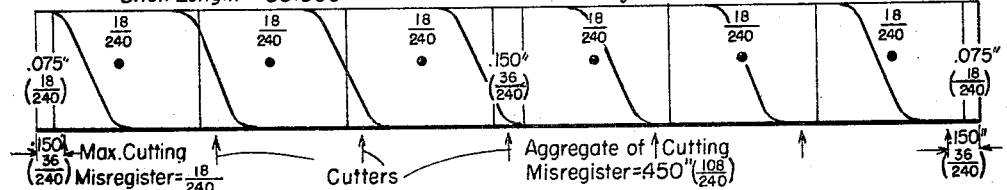
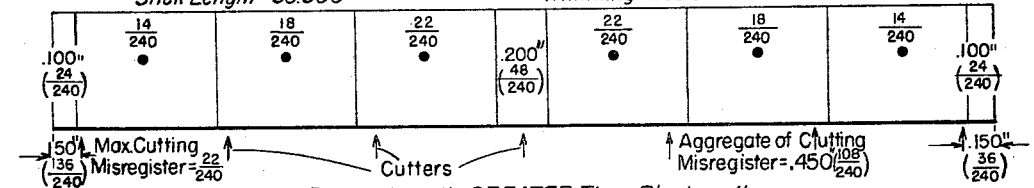
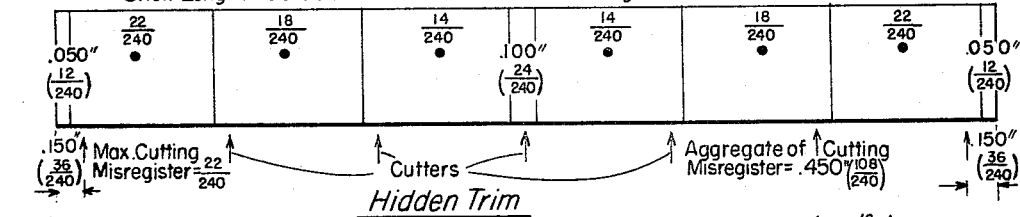
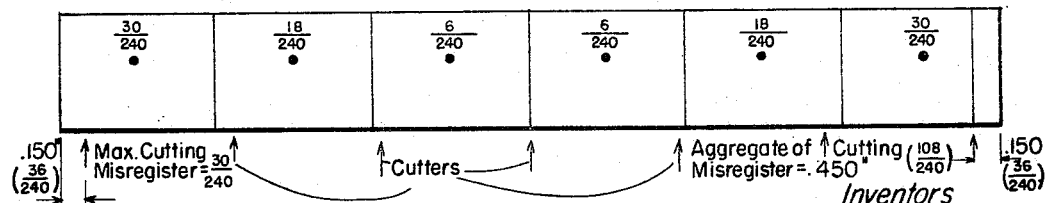
Inventors
Francis G. Glasby
Ernest B. Robinson
By their attorneys Aug. 9, 1966   F. G. GLASBY ETAL   3,264,956
METHOD OF MAKING SPIRALLY WOUND CONTAINERS
Filed Aug. 20, 1963   5 Sheets-Sheet 2

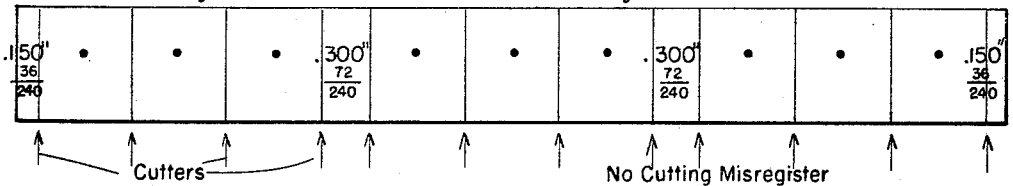

FIG. 6 — 3 Cylinder Windings per Stick
Conventional Planned Trim Relationship
Cutting Length of 1 Rim = 5"     Printing Length of 1 Rim = 5"
Printed Trim Band = .300"        Total Printed Trim = .900"
Stick Length = 45.900"           Trimming Waste = .900"

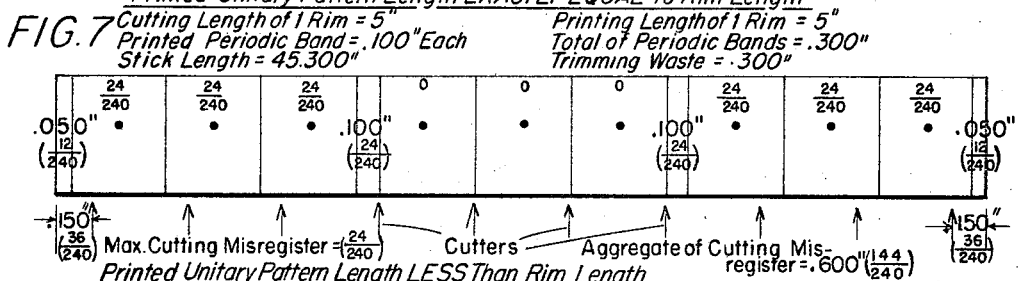

FIG. 7 — Printed Unitary Pattern Length EXACTLY EQUAL To Rim Length
Cutting Length of 1 Rim = 5"     Printing Length of 1 Rim = 5"
Printed Periodic Band = .100" Each   Total of Periodic Bands = .300"
Stick Length = 45.300"           Trimming Waste = .300"

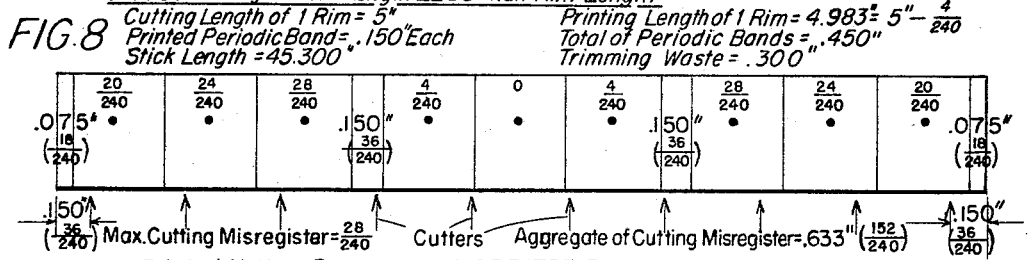

FIG. 8 — Printed Unitary Pattern Length LESS Than Rim Length
Cutting Length of 1 Rim = 5"     Printing Length of 1 Rim = 4.983"= 5"− 4/240
Printed Periodic Band = .150" Each   Total of Periodic Bands = .450"
Stick Length = 45.300"           Trimming Waste = .300"

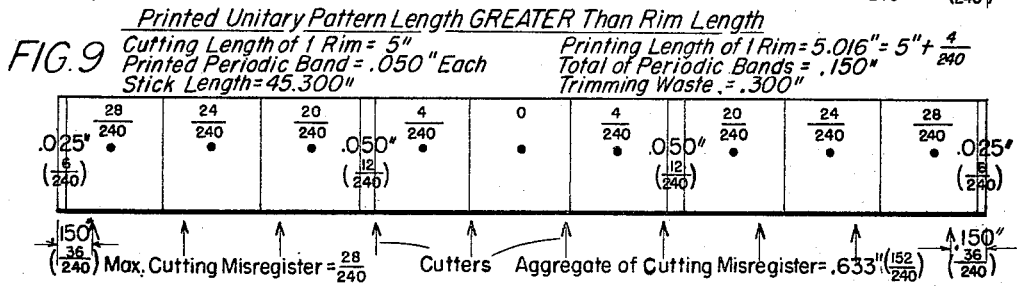

FIG. 9 — Printed Unitary Pattern Length GREATER Than Rim Length
Cutting Length of 1 Rim = 5"     Printing Length of 1 Rim = 5.016"= 5"+ 4/240
Printed Periodic Band = .050" Each   Total of Periodic Bands = .150"
Stick Length = 45.300"           Trimming Waste = .300"

FIG. 10  Cutting Length of 1 Rim = 5"  *Hidden Trim*  Printing Length of 1 Rim = 5.033"= 5"+ 8/240
Stick Length = 45.300"           Trimming Waste = .300"

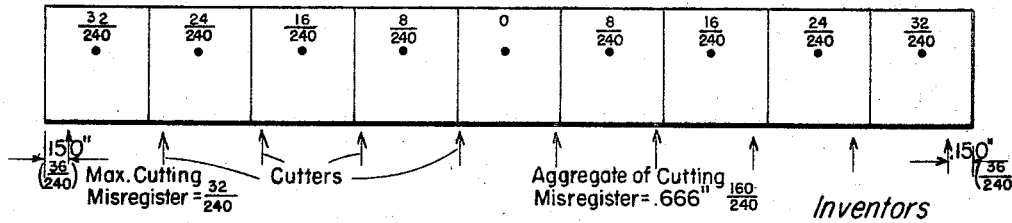

Inventors
Francis G. Glasby
Ernest B. Robinson
By their attorneys
Howson and Howson Aug. 9, 1966  F. G. GLASBY ETAL  3,264,956
METHOD OF MAKING SPIRALLY WOUND CONTAINERS
Filed Aug. 20, 1963  5 Sheets-Sheet 3
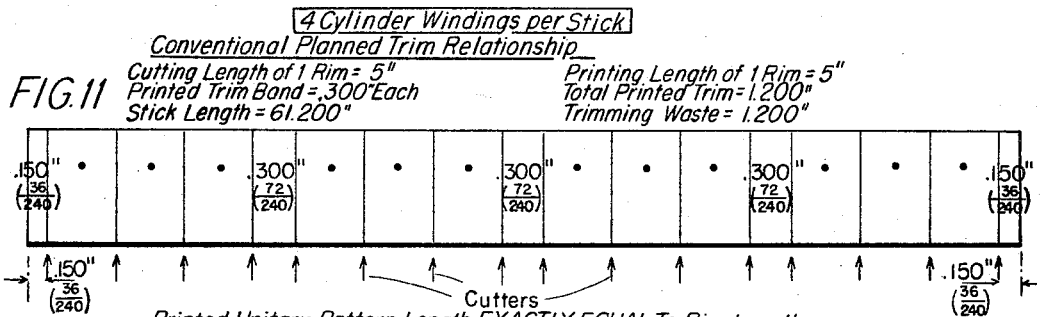
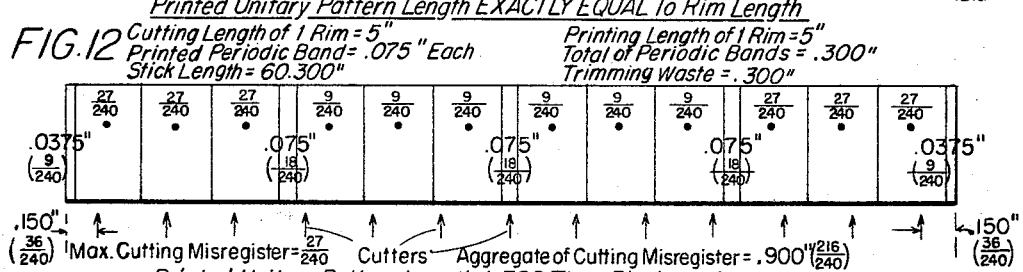
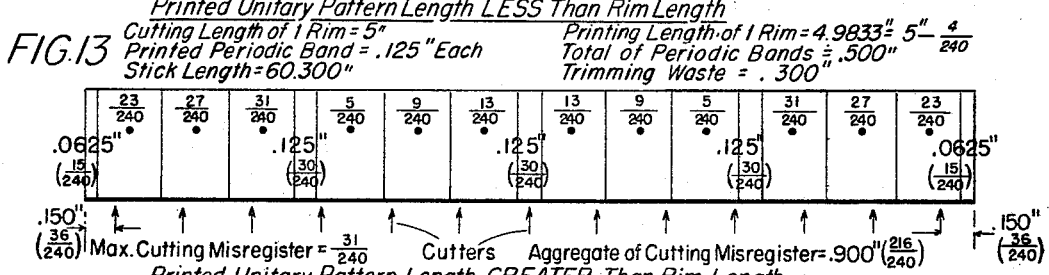
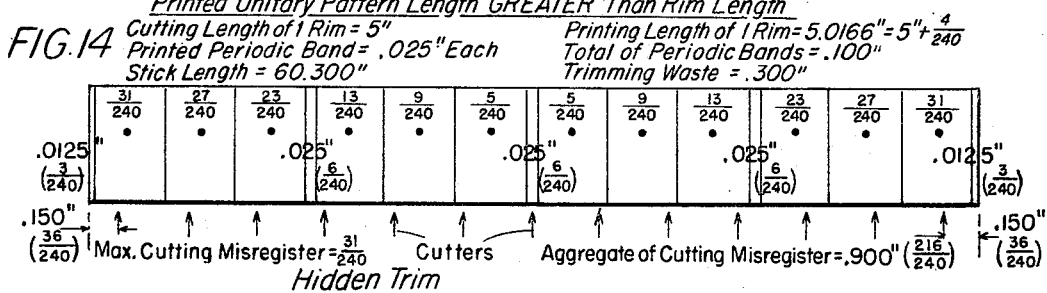
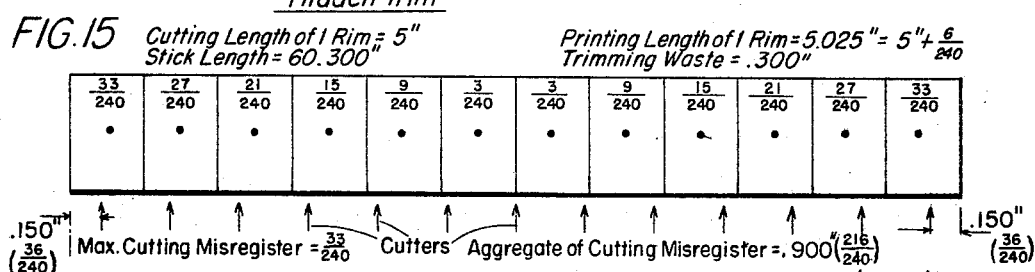
Inventors
Francis G. Glasby
Ernest B. Robinson
By their attorneys
Howson and Howson

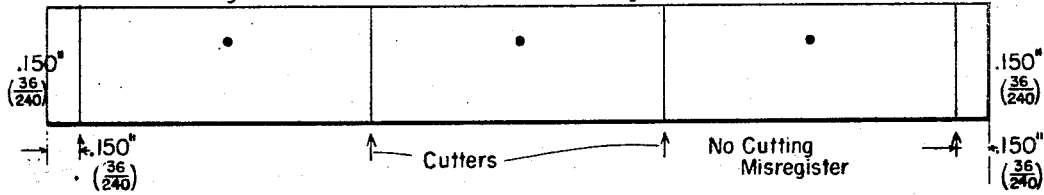
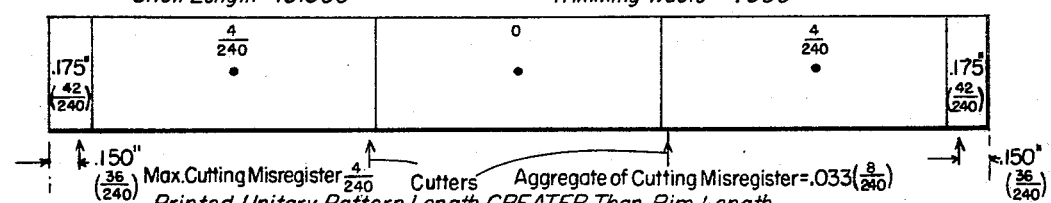
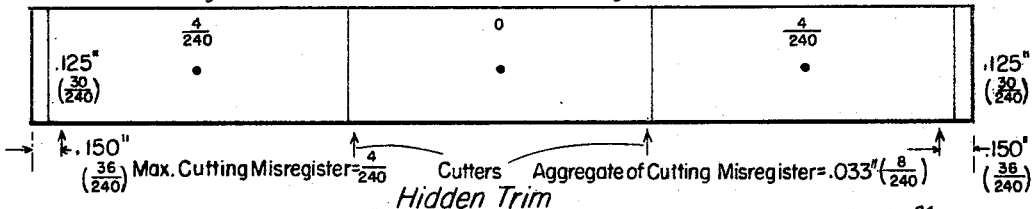
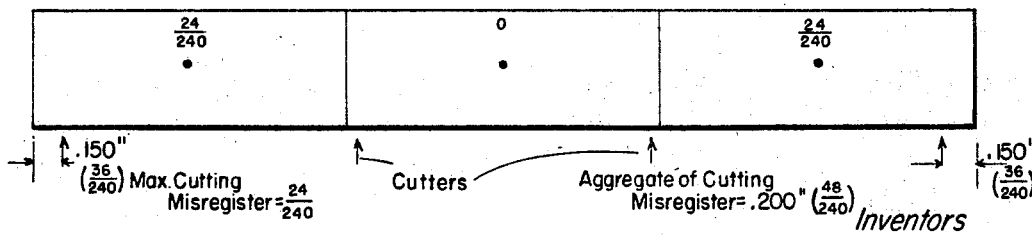
Inventors
Francis G. Glasby
Ernest B. Robinson
By their attorneys Aug. 9, 1966  F. G. GLASBY ETAL  3,264,956
METHOD OF MAKING SPIRALLY WOUND CONTAINERS
Filed Aug. 20, 1963  5 Sheets-Sheet 5

FIG. 21

Printed Unitary Pattern Length LESS Than Rim Length

Cutting Length of 1 Rim = 5"
Printed Periodic Band = .200" Each
Stick Length = 30.300"

Printing Length of 1 Rim = 4.9833" = 5" − $\frac{4}{240}$
Total of Periodic Bands = .400"
Trimming Waste = .300"

Max. Cutting Misregister = .300" ($\frac{72}{240}$)

Aggregate of Cutting Misregister = .450" ($\frac{108}{240}$)

Stick Length

Waste Ring
Periodic Band
Periodic Band

FIG. 17

Printed Unitary Pattern Length LESS Than Rim Length

Cutting Length of 1 Rim = 5"
Printed Periodic Band = .200" Each
Stick Length = 30.300"

Printing Length of 1 Rim = 4.9833" = 5" − $\frac{4}{240}$
Total of Periodic Bands = .400"
Trimming Waste = .300"

Max. Cutting Misregister = $\frac{42}{240}$

Aggregate of Cutting Misregister = .533" ($\frac{128}{240}$)

.150" ($\frac{36}{240}$)

Cutters

Inventors
Francis G. Glasby
Ernest B. Robinson
By their attorneys

Howson and Howson

United States Patent Office 3,264,956
Patented August 9, 1966

3,264,956
METHOD OF MAKING SPIRALLY WOUND CONTAINERS
Francis G. Glasby and Ernest B. Robinson, Chesterfield, England; said Glasby assignor to Robinson & Sons Ltd., Chesterfield, England, a British company
Filed Aug. 20, 1963, Ser. No. 303,377
22 Claims. (Cl. 93—94)

This invention relates to a method of making spirally wound containers having a unitary pattern strip spirally wound on the outside and more particularly, to keeping the patterns in register with the ends of the containers. "Unitary" patterns are ones having definite beginnings and ends as distinguished from "barber pole" patterns. The invention is particularly useful when there is more than one unitary pattern per container. It will be understood that the word "container" is used in a sense to include not only finished containers but also "rims." This word "rim" means a container before the ends are applied.

In making spirally wound tubular containers with unitary patterns, it has been customary to cut sticks, i.e., bites, off the being-formed tube and to divide the stick into individual containers either simultaneously on the winding machine, or later on a machine known as a recutter.

It is well known that unitary patterns in such work, frequently get out of register with the ends of the sticks because winding and cutting errors develop as the winding machine operates resulting in damage to the end containers of the sticks.

The original method of keeping the unitary pattern in step with the ends of the containers, i.e., obtaining perfect registry of print with cut is known as "Planned Trim." It forms the subject of the Ernest B. Robinson U.S. Patent 2,623,445, dated December 30, 1952, and reissued November 23, 1954, No. 23,899. Each band was made nominally equal to the maximum winding errors expected in the stick and the surplus trim material not needed to correct for the actual winding errors in the stick was cut out. The cutting abated the error. This method involves provision of surplus space material. The pattern strips wound on the outside of such spirally wound containers are printed from cylinders the circumference of which has been relatively limited in length. Therefore, it was only rarely possible to equate, i.e., make equal, the printing cylinder circumference and the length required for the pattern strip for the entire stick. For this reason, invariably a multiplicity of planned trim bands have had to be printed and subsequently cut out. This is so because a trim band had to occur every printing cylinder circumference length regardless of the number of printing cylinder circumferences per stick length. Thus, it has been more usual than not to wind sticks containing a multiple of trim bands. It was realized that this was wasteful and "hidden trim" was invented in an effort to take care of it. Hidden trim forms the subject matter of the Ernest B. Robinson U.S. Patent 2,737,091 and calls for the provision of surplus trim after the pattern for each container. It helped to overcome the problem of stick lengths having of necessity to be equal in length to a multiple of the printing cylinder circumference and it reduced the trim required, but it did so at a sacrifice of the accuracy of register between the patterns and the container ends.

In practice, it may be desired that length of the stick be such that it contains a length of unitary pattern strip equal to one printing cylinder circumference; or the length of the stick may require a pattern strip equal to two, three or more printing cylinder circumferences. Planned trim is not adapted to take care of this last situation in the most economical fashion, but the present invention does take care of these latter instances i.e., where the length of the stick is such as to contain a pattern strip containing a plurality of printing cylinder circumferences. It does so with greater economy than has heretofore been obtainable by the planned trim method wherever the stick contains a length of pattern strip equal to two or more printing cylinder circumferences. As mentioned above, in planned trim, in order to have allowances to correct for winding errors etc., bands of surplus space material have been provided periodically in the pattern strip.

When such a pattern strip is used to make sticks containing a plurality of printing cylinder circumferences or windings, the bands of surplus space material except those appearing at the ends of the stick, according to planned trim have had to be cut out without their performing any useful function. According to the present invention the amount of surplus space material is minimized greatly compared with such practice and the intermediate periodic bands of material are not cut out.

Not only is the present invention applicable if the length of the container is, when wound, exactly equal to the printed unitary pattern or a multiple thereof but also in cases where the wound printed unitary pattern or multiple thereof is lesser or greater in length than the length of the container. It is also applicable whether there is one or a multiplicity of printing cylinder windings per stick with special advantage when there is a multiplicity.

As previously stated, the invention is applicable to the production of finished containers or of rims, where stick lengths are first cut off and later subdivided into individual containers; and it is also applicable in the alternative method of gang cutting where the containers are severed from one another on the winding machine, The present invention has advantage compared to the hidden trim method as regards misregister of unitary patterns with the container ends because the maximum degree of unavoidable misregister according to the present invention can be made less than that unavoidably occurring according to the hidden trim method. Furthermore, the aggregate of misregister of patterns on all the containers cut from a stick made according to the present invention can also be made less than for hidden trim.

The present invention requiress less surplus trim material than the planned trim method as heretofore used; and although the same amount of trim as is required by the hidden trim method the present invention provides a better register than the present hidden trim method. This advantage with regard to register, though not obvious at first, becomes understandable with study of the drawings, tables and description hereinafter set forth. They show by arithmetical analysis that there is a large and definite advantage in this respect in the present invention.

In the drawings, FIGURES 1–16 and 18–20 deal with situations of cutting into stick lengths and subsequently sub-dividing into containers.

FIGURE 21 deals with the situation where the containers are cut apart without any intermediate stick cutting operation. This figure is really a modification of FIGURE 9 adapted to show the simultaneous rim cutting. The principle illustrated applies to all the remaining figures, other than FIGURES 1, 5, 6, 10, 11, 15, 16 and 20 which relate to prior art, of the series 1–16 and 18–20. It is considered unnecessary to illustrate simultaneous cutting for all these figures as the principle is easily understood.

With specific reference to the individual figures, FIG. 1 is a diagram of a wound printed unitary pattern strip and cutter locations in the conventional planned trim of the prior art where there are two cylinder windings per stick and unitary pattern lengths are equal to the rim lengths.

FIG. 2 is a similar diagram according to the present invention in which two printing cylinder windings are required to equal one stick, and unitary pattern lengths are equal to the container lengths. For purposes of illustration, spiral joint lines are shown in this one figure on the length of tube, it being understood, that such spiral joint lines are representative of a construction suitable for tubing produced according to all embodiments shown in the drawings of this application.

FIG. 3 is a diagram similar to the layout in FIG. 2 in which the wound unitary pattern lengths are nominally less than the container lengths.

FIG. 4 is a diagram similar to FIGS. 2 and 3 in which the unitary pattern lengths are nominally greater than the container lengths.

FIG. 5 is a diagram of the hidden trim method applied to the two windings per stick situation of FIGS. 1 to 4; the view illustrating how the advantages of hidden trim are obtained without the disadvantages. The fractions shown in the drawings marked "Max. Cutting Misregister" relate to the largest difference between any one unitary pattern and the point at which it is cut. Similarly, the aggregate of cutting misregister is the total for all unitary patterns cut from one stick.

FIGS. 6 to 10 are a series of diagrams similar to FIGS. 1 to 5 except that they relate to the case of three printing cylinder windings per stick; FIG. 6 being the conventional planned trim applied in such case; FIG. 7 the invention where the printed unitary pattern length exactly equal the container length; FIG. 8 where the pattern length is less than the container length; FIG. 9 where the pattern length is greater than the container length; and FIG. 10 the hidden trim comparison for three cylinder windings per stick.

FIGS. 11 to 15 are another series of diagrams similar to FIGS. 1 to 5 and FIGS. 6 to 10 except that they relate to the case of four printing cylinder windings per stick; FIG. 11 being the conventional planned trim as it would be applied in such case; FIG. 12 the invention where the printing unitary pattern length exactly equals the container length; FIG. 13 where the pattern length is less than the container length; FIG. 14 where the pattern length is greater than the container length; and FIG. 15 the hidden trim comparison for four cylinder windings per stick.

FIGS. 16, 18, 19 and 20 are another series of diagrams similar to FIGS. 1 to 5, 6 to 10, and 11 to 15 except that they relate to the case of one printing cylinder winding per stick; FIG. 16 being the conventional planned trim relation used in such case.

FIG. 17 deals with a slightly modified form of the invention where the cut for the end of a stick occurs in the region between two adjacent patterns and shows its application to the situation where stick lengths of tube are subsequently divided into containers in an operation after cutting off sticks.

FIG. 18 where the pattern length is less than the container length; FIG. 19 where the pattern length is greater than the container length; and FIG. 20 the hidden trim comparison for one winding per stick.

FIG. 21 relates to the simultaneous gang cutting embodiment of the invention.

In order to explain the invention and the relationship of the amount of trim in the stick and the surplus space material provided in the printing cylinder, we define by the letter T the amount of surplus space material required per stick to take care of (a) errors of winding and (b) the amount required for cutting trim.

Prir to Robinson Patent 2,623,445 it was impossible to provide pattern registry except by wasting one extra unitary pattern per stick length. This generally was enormously in excess of requirements. Planned trim Patent 2,623,445 taught the insertion of a band equivalent to T into the circumference of the printing cylinder. Thus, if the number of cylinder windings per stick was one, then one "chunk" of T appeared in the stick length. If there were two cylinder windings in one stick length then there were two "chunks" per stick length, and so on, until the extreme that was likely—four "chunks" of T to a stick length.

As shown by Mr. Robinson's hidden trim Patent 2,737,091, there were some disadvantages in introducing a chunk of planned trim for a printing cylinder. These included the fact that of necessity it meant a stick length must always be a multiple of the tubular length produced by one printing cylinder circumference. Note that the amount of hidden trim provided by Robinson always equalled the amount of trim required per stick so that it its value was always T. It will be appreciated, however, that the two collars normally discarded as trim at the end of each stick consisted of two parts of unitary patterns, each being approximately equal to half T, and combined exactly equal to T.

According to the present invention, it is realizezd that there must be some way of improvement upon the hidden trim method by reducing the amount of good pattern material contained in the surplus space material T discarded at the end of the stick without having to augment the value of T by reason of having to cut away surplus material within the stick. Similarly, it was deemed advantageous to find a method which avoids the high waste of the planned trim method where long sticks requiring a multiplicity of printing cylinder windings perforce contained one or more full width trimming bands (T) in the inner regions of the stick which not only served no useful purpose, but had to be removed and discarded. According to the present invention, this has been done by introducing periodic bands which are not cut away as trim, between groups of patterns, such bands being each less than T. The periodic bands need not necessarily be different in physical appearance from either or both of the adjacent parts of the adjoining unitary patterns. In order that this point may be discussed, we will call the width of each periodic band "Z." The present invention, therefore, provides for the introduction of a periodic component, bearing a simple fractional (i.e. one divided by an integer) relationship to T, into the printing cylinder. Preferably, this component would occur once in each printing cylinder. The value of Z would be such that the total of such band width in each stick would be equal to T.

In present day practice the number of cylinder windings per stick length is usually not greater than four. Thus, we illustrate for example, four cases as follows:

(A) One cylinder winding per stick length
(B) Two cylinder windings per stick length
(C) Three cylinder windings per stick length
(D) Four cylinder windings per stick length.

Since the amount of surplus space material per stick is T, the value of Z per cylinder winding in the four cases listed above is (A)                     $Z=T$
(B)                     $Z=T/2$
(C)                     $Z=T/3$
(D)                     $Z=T/4$ Thus, the value of Z as appearing on the printing cylinder varies between T and one-quarter of T but the total amount of surplus space material per stick is always T. It is interesting to note that in the case of planned trim, the value of Z appearing in the printing cylinder is always T but the value of the trim appearing in the stick used to be one T, two T, three T and four T, for the cases above set forth. The layout of the printing cylinder for the present invention remains exactly as before in principle, namely, K designs and surplus space material Z but the value of Z has been reduced from always being exactly T to being in most cases somewhere between T and T/4. Thus, it will be seen that the new invention is a combination of hidden trim and planned trim. The Z values set forth need not be followed exactly in order to get some of the arithmetical advantages of the invention as hereinbelow explained. For instance, whilst maintaining the value of surplus space material per stick (T) at a constant value, manipulation of the unitary pattern length can be carried out in such a manner that a variation in the total length of unitary patterns in the printing cylinder is accompanied by a complementary variation of opposite sense of the total periodic band length in the printing cylinder.

The comparative relationship of planned, hidden and hybrid trim can be summarized as follows:

$T$=Minimum of trim required per stick (i.e. minimum surplus space material)
$L$=Wound length of the coil printed by one revolution (i.e. circumference) of a printing cylinder
$N$=Number of unitary patterns per stick
$K$=Number of unitary patterns per printing cylinder winding
$X$=Number of wound lengths of L per stick From the above, $$N=KX \text{ and } X=N/K$$

The amount of surplus space material (Z) per cylinder is *always* evaluated as follows:

Planned trim: $Z=T$
Hidden trim: $Z=T/X$ or $TK/N$
Hybrid trim: $Z=T/X$ or $TK/N$

EXAMPLE

Assume $T=.300''$
Assume $N=9$ i.e. 9 unitary patterns per stick
Assume $K=3$ i.e. 3 unitary patterns per printing cylinder winding
Assume $X=3$ i.e. 3 printing cylinder windings per stick

| | Surplus Space Material per cylinder (Z) | Surplus Space Material per stick (T) i.e. Amount used |
|---|---|---|
| Planned Trim | .300'' | .300''×3=.900'' |
| Hidden Trim | .300''/3=.100'' | .300''×3/3=.300'' |
| Hybrid Trim | .300''×3/9=.100'' | .300''×3×3/9=.300'' |

For arithmetic calculations a figure of .300'' has been chosen as an allowance for winding errors within a stick, this amount being convenient for subdividing to illustrate the invention and the relative register displacements. In practice this figure could be reduced or increased to equal the winding and cutting accuracies attainable on the users' equipment. Pattern centers in the drawings are indicated by large dots.

As shown in FIG. 1 of the drawings in the conventional planned trim relationship the periodic trim bands are .300 of an inch each which is the calculated amount of winding error likely to occur in a stick with two printing cylinder windings per stick. This gives a total .600 of an inch in surplus trim material because at each end of the stick there are half trim bands each of .150'', and the surplus material at the middle of the stick was also equal to .300 of an inch. The remainder of such halved trim bands appear on the adjacent sticks, the said halved trim bands being divided at the stick cutting stage. No way was known to reduce the amount of surplus material in the middle of the stick and it was necessary to employ two cutters at each surplus trim material location to cut out such material as was not needed. We have discovered as one feature of our invention that we do not need the full .300th of an inch surplus trim material for each printing cylinder winding contained within the stick because we take advantage of the presence of the periodic bands in the intermediate regions of the stick and use them in the container. These intermediate bands are not discarded during the rim cutting operation in distinction to the planned trim method demonstrated in FIG. 1.

Referring to FIG. 2 which illustrates the present invention when the unitary pattern is exactly equal to the container length, the size of the periodic bands at the middle and ends of the stick due to the fact that there are two cylinder windings per stick, is only half the size of the surplus material provided in such a situation by the conventional planned trim.

The hidden trim method discards trim only at the ends of the stick but still provides for discarding surplus trim material. The present invention operates between the planned trim and hidden trim methods and those two methods therefore can be considered as the two polar methods with relation to the present invention. The method of the present invention combines the advantages of the planned trim method, and of the hidden trim but has greater versatility and is particularly useful when dealing with cases where two or more printing cylinder windings are required per stick because of the length of the stick.

As indicated in FIG. 2 which is the case of two printing cylinder windings per stick according to the present invention as above described, the amount of surplus trim material is shown reduced to the minimum which is half that of the conventional planned trim for such a case. The manner in which the surplus trim material at the middle of the stick is disposed of will be described in connection with the second basic part of the invention, namely the manner of cutting. The surplus trim material at each end of the printed winding is one half of that of the prior art shown in FIG. 1 due to the reduced size of each pediodic band.

It might be well at this point to explain the division in the drawings and the chart in the latter part of the specification of the dimensions involved in to 240 parts. The common denominator of 240 was selected as the number that will support the range of numerators required by the various figures of the examples shown in the drawings. Thus, for example, the half periodic band of material at the outer end of the stick of FIG. 2 which is .075 inch is stated as $18/240$ and the whole periodic band at the middle of the stick in this figure being .150 of an inch is stated as $36/240$.

It might be stated at this point that the total amount of surplus space material per stick, some of which at least is inserted in the form of periodic bands, if desired, need not be more under any circumstances than exactly equivalent to the amount required by the winding errors and process requirements expected.

Assuming that the user of this method is not inserting more surplus space material than is actually required, in the embodiments of FIGS. 2, 7, 12 and 17 the manner of ascertaining the size of the periodic band to be inserted in the printing cylinder is as follows. Let the total amount of surplus space being provided in each stick be identified by the letter T. (Producing sticks for subsequent recutting or performing simultaneous winding and container cutting. Ascertain the number of printing cylinder circumferences that are to be accommodated in the stick and identify this total as X. Divide the total surplus space by the number of printing cylinder circumferences per stick, i.e., $T/X$. The result of this division will give the size of the periodic band to be inserted in the printing cylinder. Even if the use of our method deliberately inserts additional periodic bands the total length of such periodic bands per cylinder winding must still respond to $T/X$. An example of such an extra insertion of periodic bands in the printing cylinder would be to include between any two normally consecutive containers of an example such as FIG. 7 a band of planned trim of .050 of an inch which amount could be subtracted from the trim band of .100 of an inch shown in that figure.

Another advantage of the invention is that it is also applicable where the wound printed unitary pattern length is not exactly equal to the length of a container. For example, the printed unitary pattern length may be less than the length of the container when it is wound on the tube and FIG. 3 is an example of this situation where there are two printing cylinder windings per stick. On the other hand the printed unitary pattern length may be greater than the container length in such a situation and an example of this is given in FIG. 4. According to the present invention while the dimensions of bands periodically appearing between unitary patterns may be varied slightly to take care of these situations it will be seen from previous FIGS. 3 and 4 and from the corresponding FIGS. 8, 9, 13, 14, 18 and 19 and subsequent figures in the drawings where different numbers of printing cylinder windings per stick are involved the misregister is in all cases negligible. It must be remembered that if the periodic band were inserted in the printing cylinder in one chunk; i.e. as planned trim, for example, then it must appear in the stick form at the end of each wound length of printing cylinder circumference.

However, the basic advantage of the hydrid method of the present invention over existing methods of planned and hidden trim can be outlined as follows: As compared to planned trim the new method involves less material and adjacent double cutters are not necessary to cut out the overly large intermediate planned trim bands. Over hidden trim the new invention has, in the examples shown, the advantage that the maximum degree of misregister of the unitary patterns with the ends of the container is less because of the fact that however small the amount of periodic bands provided, it mops up some of the misregister. Similarly, the aggregate of misregsiter of the containers in the stick can be less than for hidden trim when the number of cylinder windings per stick is an odd number.

It might be stated at this stage that according to the invention there is a point where the unitary pattern length is changed by the design layout technician from being greater than the container length to one where it is less in length. This point is where the unitary pattern length exactly equals the container length. There are three groups in FIGS. 1–15 of the drawing. There are in each group a figure (1) which shows the planned trim of the prior art, i.e. conventional planned trim, (2) where the printed unitary pattern length is exactly equal to the container length, (3) where the total trim appearing as periodic bands is greater than surplus space requirement, i.e. the figures where the unitary pattern length is less than container length (FIG. 3 is an example), (4) where with total trim appearing as periodic bands is less than surplus space requirement (FIG. 4 is an example) and (5) which shows the hidden trim situation (FIG. 5 for example).

Thus, if we have a big unitary pattern we have a smaller periodic band and if we have a small unitary pattern, then we have a big periodic band, for the two are always complementary in relationship. In FIG. 2 of the present invention the printed unitary pattern length is always exactly equal to a container length.

Another advantage of the invention is that it makes possible a lower degree of maximum misregister of patterns with the ends of cut containers than in the case of hidden trim because however small the amount of planned trim which is introduced into the layout, it is still greater than introducing no planned trim, as in the case of hidden trim, and therefore absorbs a corresponding amount of misregister. For the same reason the aggregate containers misregister is lower in certain cases, as already described.

In referring for example to FIG. 2 where the printed unitary pattern length is exactly equal to the rim length, the length of each periodic band is exactly equal to the total surplus space requirement for each stick divided by the number of bands (i.e. printing cylinder circumferences) per stick. As a result since each unitary pattern is printed exactly equal to the cutting length, there will be a slight misregistry of cut with print and all rims will show this slight misregistry. In analogous fashion in FIGS. 3 and 4 all containers will also show equal slight misregistry. However, in the case of FIG. 4, the misregistry is augmented, cumulatively by hidden trim, (totalling $14/240$, $18/240$ and $22/240$ in the exemplative calculations). Contrariwise in the case of FIG. 3, the misregistry is decreased cumulatively (totalling $22/240$, $18/240$ and $14/240$ in the exemplative calculations).

Because the total length of periodic bands plus unitary patterns for a stick length must be equal, and in FIG. 3 the unitary pattern length is less than the container length and in FIG. 4 is greater than the container length, we have varied the trim band from .200 of an inch in width to only .100 of an inch. This gives the compensatory relationship between the periodic band width and the unitary pattern lengths.

Turning now to the second basic feature of the invention, namely the cutting, it will be noted that contrary to the situation in planned trim, there are no double cutters used in the intermediate regions of the stick because intermediate periodic bands are not discarded as waste. The register of the patterns with the ends of the containers is maintained except for a negligible amount of misregister by cutting at distances spaced apart which are equal to the lengths of the individual containers.

In the following descriptive matter, where we refer to the pattern center we mean a circumferential line situated equi-distant from the top and bottom of the printed unitary pattern as wound. For purposes of illustration in the drawings, we have shown a circular dot which is situated on the pattern center as constituted by the aforesaid circumferential line, the dot device being adopted to avoid confusion in the drawings.

Referring to FIG. 2 (two cylinder winding per stick) it will be seen that the middle cutter is placed in the middle of a trim band, and working outwards from this cutter, each pattern center shows an eqaul amount of positional error from the cutters to the extent of half the width of the band.

The fraction $18/240$ in each unitary pattern is the maximum amount of misregister for that particular pattern. The aggregate of cutting misregister is the total for all the patterns in the stick. This system is used in the other figures of the drawings also.

Referring to FIG. 7 (three cylinder windings per stick) it will be seen that the three middle pattern centers have no positional error relative to the cutters but the remaining pattern centers have positional error in the two outer cylinder windings, each patern center having a displacement equal to the width of a band relative to the cutters.

Referring to FIG. 12 (four cylinder windings per stick) it will be seen that the middle cutter is placed in the middle of the central trim band, and three pattern centers on each side of the middle cutter have positional error of half a trim band from the cutters. The remaining pattern centers, that is, three at each end of the stick contained in the two outer cylinder windings each have positional error of one and a half band widths.

Referring to FIG. 4 (two cylinder windings per stick) we see that working from the middle cutter outwards the pattern centers have a displacement relative to the patterns of $12/240''$ (i.e. half a band) plus an incremental hidden trim displacement. The hidden trim increment per pattern will be equal to the deficiency of trim bands (compared with the total trimming waste of .300") divided by the number of rims in the stick, i.e.

$$\frac{.300-.200}{6} = \frac{.100}{6} = 4/240''$$

Considering the position of the centers of the printed patterns adjacent the middle band these points are half a patterns length from the end of the pattern and will thus have only half a hidden trim increment (i.e. $2/240''$) additional to $12/240''$. Thus the two pattern centers either side of the central cutter will be misregistered by a total of $12/240''$ plus $2/240''=14/240''$. The remaining pattern centers, taken in order will have full increments of $4/240''$ as indicated in FIG. 4.

Referring to FIG. 9 (three cylinder windings per stick), the reasoning is the same as for FIG. 4. Here the hidden trim increment will be $$\frac{.300''-.150''}{9}=\frac{1}{240}''$$

and the center of the middle pattern is correctly disposed relative to the two middle cutters. The two adjacent pattern centers (moving outwards) each have a full hidden trim increment of $4/240''$. The next two pattern centers moving outwards have a further full increment of $4/240''+$a periodic band of $12/240''$ making a total displacement of $20/240''$ relative to the cutters. The remaining pattern centers have further additional hidden trim increments of $4/240''$ giving total positional errors of $24/240''$ and $28/240''$ respectively.

Referring to FIG. 14 the hidden trim increment will be $$\frac{.300''-.100''}{12}=\frac{2}{240}''$$

Considering the position of the centers of the printed patterns adjacent the middle band, these points are half a pattern's length from the end of the pattern and will thus have only half a hidden trim increment (i.e. $2/240''$) additional to the $3/240''$ (half a band). Thus the two pattern centers either side the central cutter will be misregistered by a total of $3/240''+2/240''=5/240''$. The remaining cutters, taken in order will have full increments of $4/240''$ as indicated in FIG. 2 plus additional space when the further trim bands are reached.

Referring to FIG. 3 (two cylinder windings per stick) we see that working from the middle cutter outwards the pattern centers have an equal displacement relative to the cutters of $2/240''$ (i.e. half a band) reduced by displacement in the nature of negative hidden trim. This negative displacement, per pattern will be equal to the surplus length of trim bands (compared with the total trimming waste of .300'') divided by the number of containers in the stick, i.e.

$$\frac{.400''-.300''}{6}=\frac{.100''}{6}=\frac{4}{240}''$$

Considering the position of the centers of the two printed patterns adjacent the middle band these points are half a pattern's length from the end of the pattern and will thus have only half a negative hidden trim decrement, i.e. $2/240''$ superimposed on $24/240''$. Thus these two pattern centers will be misregistered by a total of $24/240''$ minus $$2/240''=22/240''$$

The remaining patterns taken in order will have full decrements of $4/240''$ as indicated in FIG. 3.

Referring to FIG. 8 (three cylinder windings per stick), here the negative hidden trim decrement will be $$\frac{.450''-.300''}{9}=\frac{4}{240}''$$

per pattern length. In FIG. 8 the center of the middle pattern of the stick is correctly disposed relative to the middle cutters. The two adjacent pattern centers (moving outwards) each have a full negative hidden trim decrement of $4/240''$. The next two pattern centers moving outwards each have a further full decrement of $4/240''$ giving $30/240''$ minus $8/240''=28/240''$ displacement. The remaining pattern centers have further decrements of $4/240''$ giving totals of $24/240''$ and $20/240''$ pattern center displacements respectively.

Referring to FIG. 13 (four cylinder windings per stick), the reasoning is the same as for FIG. 8. Here the negative hidden trim decrement will be $$\frac{.500''-.300''}{12}=\frac{4}{240}''$$

The middle cutter is in the middle of a trim band. Thus the centers of the two patterns adjacent the middle cutter will have a displacement of $15/240''$ minus half a decrement (i.e. $2/240''$) giving a total displacement of $13/240''$. The remaining pattern centers taken in order will have full decrements of $4/240''$ plus additional positive shunt when the further trim bands are reached.

FIGS. 18 and 19 being for one printing cylinder winding per stick represent special cases.

Referring to FIG. 19, the hidden trim increment per pattern will be $$\frac{.300''-.250''}{3}=\frac{.05''}{3}=\frac{4}{240}''$$

Since there are no full periodic bands situated intermediately within the stick there is no displacement of the pattern centers but as the pattern length is greater than the container length, there will be a hidden trim displacement of the centers of the two outer patterns of $4/240''$ relative to the cutters.

Referring to FIG. 18, the negative hidden trim decrement per pattern will be $$\frac{.350''-.300''}{3}=\frac{.050''}{3}=\frac{4}{240}''$$

Since there are no full periodic bands situated intermediately within the stick there is no displacement of the pattern centers but as the pattern length is smaller than the container length there will be a negative hidden trim displacement of the centers of the two outer patterns of $4/240''$ relative to the cutters.

Thus, the embodiments of FIGS. 18 and 19 differ from and improve upon planned trim and hidden trim in providing better register than hidden trim and less waste than planned trim just as do the previously described embodiments.

The application of the cutters to the stick in FIGS. 2, 3, 4, 7, 8, 9, 12, 13 and 14 can be applied by sighting upon the central pattern boundary, or center of the middle periodic band of the stick, thus achieving symmetry of the group of cutters with the group of patterns within the stick. An alternative cutting procedure would be that of applying the group of cutters symmetrically within the length of the stick rather than the middle. The drawings illustrating these embodiments of the present invention are applicable to both the foregoing procedures, and in principle to any modifications thereof.

It should be borne in mind that the wastage of .150'' of material cut off at each end of the stick (i.e. .300'' total) shown in the drawings of the described embodiments of the invention is representative only of the conditions where the stick has achieved correct nominal winding quality as regards length and pitch of patterns (i.e. without winding error) and represents the average conditions which will prevail.

Thus winding error variations from standard for which provision has been made will result in variation of the nominal total wastage of .300'' but this latter amount will represent the average wastage.

The description in connection with FIGS. 1–16 and 18–20 proceeded on the basis that the stick lengths were being cut from a continuously formed tube by a separate cutter extra to those subsequently used to sever the containers from one another and from the trim. However, the invention is equally applicable and useful when the stick is cut and simultaneously the containers are severed on the winding machine.

FIG. 21 shows the cutting of pattern tube into individual containers as the tube is formed according to this invention by the simultaneous application of a multiplicity (gang) of cutters. Therein we see that the relationship of the patterns to the cutters is identical to that of corresponding re-cutting into containers of pre-cut sticks shown in FIG. 3. In FIG. 1, as in FIG. 3, the printed unitary pattern is less in length than the rim length. The conditions of FIG. 21 vary from those of FIG. 3 in the manner of separation of the nominal .300" total waste.

In the invention as illustrated in FIGS. 2-4, 7-9, 12-14, 18 and 19, the waste trim is divided between the two ends of the stick. In FIG. 21, the procedure is employed that has been customary in the manufacture of simultaneously cut-up tube lengths, namely for the waste trim to be produced only at the leading end of the tube. Similarly, in FIGS. 2-4, 7-9, 12-14, 18 and 19, the waste may be cut off in one whole ring .300" wide at the leading end only of the length of tube being operated upon.

FOR FIG. 21, the layout of the printed strip is identical with that of FIG. 3, and the cut rims will have identical pattern register. FIG. 21 shows the continuously formed patterned tube moving in the direction of the arrow, with a gang of 7 cutters in appropriate axial relationship with the patterns produced by 2 printing cylinder windings thereon and ready for severing. The gang of cutters will preferably be traversing axially at the same speed as the tube and may be placed in the aforementioned relationship by means well known in the art. Such means are described in Robinson U.S. Patent 2,699,099 as well as other issued Robinson U.S. patents. The ring of tube marked "waste ring" at the leading end of the moving tube will be severed during the current cutting sequence, and includes a periodic band.

It will be seen that the total amount of surplus space material discarded can be reduced to that discarded in the hidden trim method. In this FIG. 21 embodiment the stick cutting operation need not take place in the region of a periodic band but could be placed in the region of a pattern boundary. Thus all the periodic band material would appear within the stick.

As in the other embodiments the waste situation is always better than for planned trim when several printing cylinder windings are included in the stick.

We give below in tubular form the maximum and aggregate of the amount of misregister for the average winding condition when using our hybrid method in specific examples where there are one, two, three and four printing cylinder windings per stick and for comparison the tabulation also shows the two polar prior art methods. Ordinarily the number of printing cylinder windings per stick does not go beyond four but the principles of this invention can also be applied to any number in excess of four. It will be seen that the aggregate and individual container misregister according to our invention is negligible in amount and well within commercial tolerance of the present day. The method of the present invention will be of increasing value as the accuracies of modern day machinery increase and the amount of periodic band grows less.

"Multiple" as used herein and in the claims means a whole number in excess of one.

It is within the scope of the claims to wind printed unitary patterns visible on the interior surface, the exterior surface or both. By visible, we means that the unitary patterns need not actually be present on the exposed surface, whether it be outside or inside of the tube, but may be covered by a transparent film. It is of course also within the scope of the invention that the printing could appear on the reverse side of the film, so that it can only be seen and not be touched whether the film is on the exterior or the interior surface of the tube. It is also within the scope of the invention for the pattern to be sandwiched between transparent plies so as to be visible on both the outside and inside surfaces of the tube.

In practising the present invention, many users will carry out the spiral winding operation in continuous fashion except for occasional machine stoppages for the purpose of replenishing reel stock, cleaning, etc. The increasing practice of splicing reel stock has in some cases eliminated the need for stoppage for reel stock replenishment When winding in such continuous manner, the sticks from which the containers are subsequently cut, or which are simultaneously cut into containers are severed from the continuously moving tube. The present invention is also equally suitable for use with machines where the winding is done intermittently as is often the case in the production of polygonal spiral tubes, such machines also being suitable for the production of tubes of circular section and the cutting means associated with such machines are adaptable to this invention.

*Table of cutting misregister*

Cutting misregister relative to pattern in $\frac{1}{240}''$

|  | Figure Number | 1 Planned Trim | | 2 Printed Unitary Pattern Length Exactly Equal to Rim Length | | 3 Printed Unitary Pattern Length Greater Than Surplus Space Requirement | | 4 Printed Unitary Pattern Length Less Than Surplus Space Requirement | | 5 Hidden Trim | |
|---|---|---|---|---|---|---|---|---|---|---|---|
|  |  | Max. | Aggr. | Max. | Aggr. | Max. | Aggr. | Max. | Aggr. | Max. | Aggr. |
| Two windings, per stick | 1 | 0 | 0 |  |  |  |  |  |  |  |  |
|  | 2 |  |  | 18 | 108 |  |  |  |  |  |  |
|  | 3 |  |  |  |  | 22 | 108 |  |  |  |  |
|  | 4 |  |  |  |  |  |  | 22 | 108 |  |  |
|  | 5 |  |  |  |  |  |  |  |  | 30 | 108 |
| Three windings, per stick | 6 | 0 | 0 |  |  |  |  |  |  |  |  |
|  | 7 |  |  | 24 | 144 |  |  |  |  |  |  |
|  | 8 |  |  |  |  | 28 | 152 |  |  |  |  |
|  | 9 |  |  |  |  |  |  | 28 | 152 |  |  |
|  | 10 |  |  |  |  |  |  |  |  | 32 | 160 |
| Four windings, per stick | 11 | 0 | 0 |  |  |  |  |  |  |  |  |
|  | 12 |  |  | 27 | 216 |  |  |  |  |  |  |
|  | 13 |  |  |  |  | 31 | 216 |  |  |  |  |
|  | 14 |  |  |  |  |  |  | 31 | 216 |  |  |
|  | 15 |  |  |  |  |  |  |  |  | 33 | 216 |
| One winding only | 16 | 0 | 0 |  |  |  |  |  |  |  |  |
|  | 17 |  |  | 0 | 0 |  |  |  |  |  |  |
|  | 18 |  |  |  |  | 4 | 8 |  |  |  |  |
|  | 19 |  |  |  |  |  |  | 4 | 8 |  |  |
|  | 20 |  |  |  |  |  |  |  |  | 24 | 48 |

Explanatory Note.—The denominator of 240 is selected as it is the smallest number that will support the various prime number numerators required by all the various figures, e.g. in figure 2 the band of .150" thus becomes 36/240".

What we claim is:

1. A method of winding containers having a unitary pattern strip spirally wound so as to be visible on at least one surface thereof, comprising the steps of, spirally winding a tube, simultaneously winding spirally so as to be visible on at least one surface of the tube a pattern strip bearing repeated groups of unitary patterns with a periodic space between each such repeated group of patterns the spaces appearing as circumferential bands when wound on the tube, the unitary patterns differing slightly in wound lengths from the required length of the container, then cutting the tube symmetrically with relation to the groups of patterns so as to cut apart the containers in a stick length in the region of a pattern group boundary at distances corresponding to the required lengths of the containers;

whereby containers of correct length are produced with unitary patterns in approximate register with the ends of the containers, any bands between pattern groups being absorbed into the containers and any excess material left over being only at the ends of the stick.

2. A method of winding containers having a unitary pattern strip spirally wound on the outside thereof comprising the steps of winding a tube spirally winding spirally on the outside of the tube a pattern strip bearing repeated groups of unitary patterns with a periodic space between each such repeated groups of patterns, the spaces appearing as circumferential bands when wound on the tube, the total length of the periodic bands in the stick to be cut off added to the total length of the individual patterns in the stick being a constant for any given pattern strip layout, then cutting the tube symmetrically with relation to the groups of patterns so as to cut apart the containers in that stick length in the region of the pattern group boundaries at distances corresponding to the required lengths of the containers whereby containers of correct length are produced with unitary patterns in approximate register with the ends of the containers, any bands between pattern groups being absorbed into the containers and any excess material left over being only at the ends of the stick.

3. A method of winding containers having a unitary pattern strip spirally wound on the outside thereof, comprising the steps of winding a tube spirally, winding spirally on the outside of the tube a pattern strip bearing repeated groups of unitary patterns with a periodic space between each such repeated group, the spaces appearing as circumferential bands when wound on the tube, then cutting the tube symmetrically in stick lengths with relation to the groups of patterns so as to cut apart the containers at distances, not including the bands at the ends of the sticks, corresponding to the required lengths of the containers, whereby containers of correct length are produced with unitary patterns in approximate register with the ends of the containers, and any bands in the sticks between patterns are absorbed into the containers.

4. A method of winding containers having a unitary pattern strip spirally wound so as to be visible on at least one surface thereof, comprising the steps of winding a tube spirally, simultaneously winding spirally so as to be visible on at least one surface of the tube a pattern strip bearing repeated groups of a plurality of unitary patterns with periodic spaces only between said groups, the spaces there being two or more groups of patterns in each stick length when wound appearing as circumferential bands when wound on the tube, then cutting apart the containers in a stick of the patterned tube by cutting the tube symmetrically with relation to the patterns at distances corresponding to the required lengths of the containers without removing the bands intermediate the ends of the stick.

5. A method of winding containers having a unitary pattern strip spirally wound on the outside thereof, comprising the steps of winding a tube spirally, while winding so as to be visible on the outside thereof a pattern strip bearing groups of a plurality of unitary patterns with periodic surplus space material between each group, when wound there being two or more such groups of patterns in each stick length, the periodic spaces appearing as circumferential bands when wound on the tube, then cutting symmetrically with relation to the patterns in a stick length so as to cut apart the containers in the stick at distances corresponding to the required lengths of the containers; and without removing any intermediate band whereby the waste of the band is minimized.

6. A method of producing cylindrical containers having unitary patterns spirally wound so as to be visible on the exterior comprising the steps of winding a tube spirally, applying a spiral label on the exterior of the tube whilst continuing winding, such label having bands constituting boundary areas, between repeated groups of unitary patterns, appearing as circumferential bands on the tube, cutting off a stick length equal to an exact multiple of the pitch of such bands, said cutting being performed in the region of a band, then applying a battery of cutters pitched continuously from each other at a distance corresponding to the required finished length of a container to subdivide said stick, whereby containers of correct length are produced with unitary patterns in approximate register with the ends thereof, excess material is removed at each end of the stick only and bands between patterns in each stick are absorbed into the cut containers.

7. A method of spirally winding cylindrical containers having a unitary pattern strip spirally wound so as to be visible on the outside comprising the steps of continuously spirally winding a tube containing one or more plies of material, there being a ply forming a a label having unitary patterns each of a length equal to the cut length of a container and periodic bands situated between groups of unitary patterns, said bands appearing as circumferential bands on the tube, the total length of the periodic bands in the stick to be cut off added to the total length of the individual patterns in the stick being a constant for any given pattern strip layout, cutting off a stick of length equal to an exact multiple of the pitch of such periodic bands, each stick containing a whole number of unitary patterns plus surplus space material, the width of each periodic band being equal to not more than one half of the amount of the aforesaid surplus space material, the amount of said surplus space material having been determined as being equal to the maximum likely deviation of stick length from nominal due to winding errors plus the amount required for cutting trim, then applying a battery of cutters pitched continuously from each other at a distance corresponding to the required finished length of a container to subdivide said stick, whereby containers of correct length are produced with unitary patterns in approximate register with the ends thereof, excess material is removed at each end of the stick only, and bands between patterns in each stick are absorbed into the cut containers.

8. A method of producing containers having unitary patterns spirally wound on the exterior comprising the steps of winding a tube spirally, applying a spiral label on the exterior of the tube while continuing winding, such label having bands periodically appearing as circumferential bands on the tube when wound on the tube, constituting boundary areas between repeated groups of unitary patterns, cutting off a stick length equal to an exact multiple of the pitch of such periodic bands, said cutting being performed in the region of a band, then applying a battery of cutters all pitched at a distance corresponding to the required finished length of a container to subdivide said stick, whereby containers of correct length are produced with unitary patterns in approximate register with the ends thereof.

9. A method of producing containers having unitary patterns spirally wound on the exterior comprising the steps of winding a tube spirally, applying a spiral label on the exterior of the tube while continuing winding, such label having bands periodically appearing as circumferential bands on the tube when wound on the tube, constituting boundary areas between repeated groups of unitary patterns, cutting off a stick length equal to the pitch of a multiple of such periodic bands, said cutting being performed at the junction of adjacent patterns, then applying a battery of cutters pitched from each other at a distance corresponding to the required finished length of a container to subdivide said stick, whereby containers of correct length are produced with unitary patterns in approximate register with the ends thereof, excess material is removed only at each end of the stick, and bands between patterns in each stick are absorbed into the cut containers.

10. A method of winding cylindrical containers having unitary patterns wound spirally on the outside thereof, comprising the steps of winding a tube spirally, simultaneously winding spirally on the outside of the tube a pattern strip bearing groups of unitary patterns each containing a plurality of patterns with periodic spaces therebetween at the rate of one space per circumference of the cylinder by which printed, the spaces appearing as circumferential bands when wound on the tube, then, cutting the tube symmetrically with relation to the patterns at distances corresponding to the required length of the containers, a stick length at a time without removing all the bands completely, whereby containers of correct length are produced with unitary patterns in approximate register with the ends of the container.

11. A method of producing containers having unitary patterns spirally wound so as to be visible on at least one surface comprising the steps of winding a tube spirally, applying a spiral label visible on at least one surface of the tube while continuing winding, such label having bands constituting boundary areas between repeated groups of unitary patterns periodically appearing as circumferential bands on the tube, cutting off a stick length equal to the pitch of such periodic bands or a multiple thereof, said cutting being performed at the ends of patterns, then applying a battery of cutters pitched from each other at a distance corresponding to the required finished length of a container to subdivide said stick;

whereby containers of correct length are produced with unitary patterns in approximate register with the ends thereof, excess material is removed only at each end of the stick, and bands between patterns in each stick are absorbed into the cut containers.

12. A method of producing containers having unitary patterns spirally wound on the exterior comprising the steps of winding a tube spirally, applying a spiral label on the exterior of the tube while continuing winding, such label having periodic bands constituting boundary areas between repeated groups of unitary patterns, when wound on the tube, appearing as circumferential bands on the tube, each pattern being of a length corresponding to the cut length of a container, cutting off a stick length equal to an exact multiple of the pitch of such periodic bands, the total length of the periodic bands appearing in the stick being equal to the nominal amount of surplus space material required for trimming off at the ends of the stick, said cutting off being performed in the region of a band, then applying a battery of cutters pitched from each other at a distance corresponding to the required finished length of a container to subdivide said stick;

whereby containers of correct length are produced with unitary patterns in approximate register with the ends thereof, excess material is removed at each end of the stick only, and bands between patterns in each stick are absorbed into the cut containers.

13. A method of producing containers having unitary patterns spirally wound on the exterior comprising the steps of winding a tube spirally, applying a spiral label on the exterior of the tube while continuing winding, such label having periodic bands constituting boundary areas between repeated groups of unitary patterns when wound on the tube, appearing as circumferential bands on the tube, each pattern being of a length corresponding to the cut length of a container, cutting off a stick length equal to an exact multiple of the pitch of such periodic bands, the total length of periodic bands appearing in the stick being equal to the nominal amount of surplus space material required for trimming off at the ends of the stick, said cutting off being performed in the region between a boundary adjacent patterns, then applying a battery of cutters pitched from each other at a distance corresponding to the required finished length of a container to subdivide said stick;

whereby containers of correct length are produced with unitary patterns in approximate register with the ends thereof, excess material is removed at each end of the stick only, and bands between patterns in each stick are absorbed into the cut containers.

14. A method of producing containers having unitary patterns spirally wound on the exterior comprising the steps of winding a tube spirally, applying a spiral label on the exterior of the tube while continuing winding, such label having periodic bands appearing as circumferential bands on the tube, constituting boundary areas between repeated groups of unitary patterns, each pattern being of a length corresponding to the cut length of a container, cutting off a stick length equal to an exact multiple of the pitch of such periodic bands, the total length of periodic bands appearing in the stick being equal to the nominal amount of surplus space material required for trimming off at one or more ends of the stick, said cutting off being performed at the ends of patterns, then applying a battery of cutters pitched continuously from each other at a distance corresponding to the required finished length of a container to subdivide said stick;

whereby containers of correct length are produced with unitary patterns in approximate register with the ends thereof, excess material is removed at each end of the stick only, and bands between patterns in each stick are absorbed into the cut containers.

15. A method of making containers having unitary patterns spirally wound so as to be visible on at least one surface comprising the steps of continuously spirally winding a tube containing one or more plies of material, one of said plies forming a label having unitary patterns thereon each of a length equal to the cut length of a container and periodic bands situated between groups of unitary patterns, said periodic bands appearing as circumferential bands on the tube, cutting off a stick of length equal to an exact multiple of the pitch of such periodic bands the stick containing a whole number of unitary patterns plus surplus tube material, the width of each periodic band being not more than one-half of the amount of the aforesaid surplus tube material, the amount of said surplus tube material having been determined as being equal to maximum likely deviation of stick length from nominal due to winding errors, plus the amount required for cutting trim, and applying a battery of cutters pitched continuously from each other at a distance corresponding to the required finished length of a container to subdivide said stick;

whereby containers of correct length are produced with unitary patterns in approximate register with the ends thereof, excess material is removed at each end of the stick only, and bands between patterns in each stick are absorbed into the cut containers.

16. A method of spirally winding containers having a unitary pattern strip spirally wound so as to be visible on the outside, comprising the steps of continuously spirally winding a tube containing one or more plies of material, there being a ply forming a label having unitary patterns each of a length not less than the cut length of a container and periodic bands situated between groups of unitary patterns, said periodic bands appearing as circumferential bands when wound on the tube, the total length of the periodic bands in the stick to be cut off added to the total length of the individual patterns of the stick being a constant for any given pattern strip layout, cutting off a stick of length equal to an exact multiple of the pitch of such periodic wound bands, each stick containing a whole number of unitary patterns and including surplus space material, the total of the widths of the periodic wound bands provided not being more than the amount of the aforesaid surplus space material, the amount of such surplus space material having been determined as being equal to the maximum likely deviation stick length from the nominal due to winding errors plus the amount required for cutting trim, applying a battery of cutters pitched continuously from each other at a distance corresponding to the required finished length of a container to subdivide said stick;

whereby containers of correct length are produced with unitary patterns in approximate register with the ends thereof, excess material is removed at points other than intermediate the unitary patterns in the stick, and the bands between the patterns in each sick are absorbed into the cut containers.

17. A method of spirally winding containers having a unitary pattern strip spirally wound so as to be visible on the outside, comprising the steps of continuously spirally winding a tube containing one or more plies of material, one of said plies forming a label having unitary patterns thereon visible on the exterior of the tube, each unitary pattern being of a length equal to the cut length of a container and periodic bands situated between groups of unitary patterns, said periodic bands appearing as circumferential bands on the tube, cutting off a stick of length equal to an exact multiple of the pitch of such periodic wound bands, each stick containing a whole number of unitary patterns plus surplus space material, the width of each such periodic wound band being equal to ⅓ the amount of the aforesaid surplus space material, the amount of said surplus space material having been determined as being equal to the maximum likely deviation of stick length from nominal due to winding errors plus the amount required for cutting trim, applying a battery of cutters all pitched at distances corresponding to the required finished lengths of the containers to subdivide said stick;

whereby containers of correct length are produced with unitary patterns in approximate registry with the ends thereof, excess material is removed at each end of the stick, and periodic bands between the unitary patterns in each stick are absorbed into the cut containers.

18. A method of making containers having unitary patterns spirally wound on the exterior, comprising the steps of continuously winding a tube containing one or more plies of material, one of said plies forming a label having unitary patterns thereon visible on the exterior each of a length equal to the cut length of a container and surplus space material comprising periodic bands situated between groups of the unitary patterns, said periodic bands appearing as circumferential bands on the tube, the width of each periodic band being equal to the amount of the aforesaid surplus tube material divided by the number of groups of unitary patterns contained within each stick to be cut off, the amount of said surplus tube material having been determined as being equal to the maximum likely deviation of stick lengths from nominal due to winding errors plus the amount required for cutting trim, then, cutting off sticks of length equal to an exact multiple of the pitch of said periodic bands, each stick containing a whole number of unitary patterns plus surplus tube material, said cutting being done by a battery of cutters pitched continuously from each other at a distance corresponding to the required finished length of a container to subdivide said sticks;

whereby containers of correct length are produced with unitary patterns in approximate registry with the ends of the containers, excess material is removed only at the ends of the sticks, and bands between patterns in each stick are absorbed into the cut containers.

19. A method of spirally winding cylindrical containers having a unitary pattern strip spirally wound so as to be visible on the outside, comprising the steps of continuously spirally winding a tube containing one or more plies of material, one of said plies forming a label having unitary patterns thereon each of a length not greater than the cut length of a container and periodic bands situated between groups of unitary patterns, said periodic bands appearing when wound as circumferential bands on the tube, cutting off a stick of length equal to an exact multiple of the pitch of such periodic bands, each stick containing a whole number of unitary patterns and including surplus space material, the width of each periodic band being less than the whole amount of the aforesaid surplus space material, the amount of said surplus space material having been determined as being equal to the maximum likely deviation of stick length from nominal due to winding errors plus the amount required for cutting trim, and applying a battery of cutters pitched continuously from each other at a distance corresponding to the required finished length of a container to subdivide said stick;

whereby containers of correct length are produced with unitary patterns in approximate register with the ends thereof, excess material is removed at each end of the stick and bands between patterns in each stick are absorbed into the cut containers and misregister is minimized.

20. A method of winding containers having a unitary pattern strip wound on the outside thereof, comprising the steps of winding a tube spirally, simultaneously winding spirally on the outside of the tube a pattern strip bearing groups of unitary patterns with periodic spaces between each group, the spaces apperaing as circumferential bands when wound on the tube, then, cutting stick lengths off the tube by cutting means placed symmetrically about the middle patterns of the sticks, said cutting means all being pitched at distances corresponding to the required lengths of the containers, the stick lengths corresponding to an exact multiple of the pitch of the bands;

whereby containers of correct length are produced with the unitary patterns in approximate registry with the container ends, excess material is removed only from the ends of the sticks and bands between patterns in the sticks are absorbed into the containers.

21. A method of winding containers having a unitary pattern strip wound on the outside thereof, comprising the steps of winding a tube spirally, simultaneously winding spirally on the outside of the tube a pattern strip bearing groups of unitary patterns with periodic spaces between each group, the spaces appearing as circumferential bands when wound on the tube, then, cutting stick lengths off the tube by means of cutters all applied in constant space relationship to the patterns within the sticks at distances corresponding to the lengths of the containers, the stick lengths corresponding to an exact multiple of the pitch of the bands;

whereby containers of correct length are produced with the unitary patterns in approximate registry with the container ends, excess material is removed only from the ends of the sticks and bands between patterns in the sticks are absorbed into the containers.

22. A method of making containers having unitary patterns spirally wound on the exterior, comprising the steps of continuously spirally winding a tube containing one or more plies of material, a ply visible from the outside forming a label having unitary patterns thereon each of a length less than the cut length of a container and periodic bands situated between groups of the unitary patterns, said periodic bands appearing as circumferential bands on the tube, cutting off sticks of length equal to an exact multiple of the pitch of said periodic bands, each stick containing a whole number of unitary patterns and including surplus space material, the total of the widths of the periodic bands being greater than the aforesaid surplus space material in a stick, the amount of said surplus space material having been determined as being equal to the maximum likely deviation of stick lengths from nominal due to winding errors plus the amount required for cutting trim, said cutting being done by a battery of cutters pitched contiously from each other at a distance corresponding to the required finished length of a container to subdivide said sticks;

whereby containers of correct length are produced with unitary patterns in approximate registry with the ends thereof, excess material is removed only at the ends of the sticks, periodic bands located between patterns in each stick are absorbed into the cut containers and misregister is minimized.

References Cited by the Examiner
UNITED STATES PATENTS 2,734,432   2/1956   Robinson et al. _____ 93—80
2,737,091   3/1956   Robinson _____ 93—80

BERNARD STICKNEY, *Primary Examiner*.